United States Patent [19]

Atkins et al.

[11] 4,256,472
[45] Mar. 17, 1981

[54] MIST FILTER FOR EXTRACTING MOISTURE FROM OUTLET AIR FROM AUTO AIR CONDITIONER

[75] Inventors: Jack Atkins, Memphis; William E. Cayce, Germantown, both of Tenn.

[73] Assignee: Lifetime Industries, Memphis, Tenn.

[21] Appl. No.: 72,340

[22] Filed: Sep. 4, 1979

[51] Int. Cl.³ .................... B01D 51/00; B60H 3/06
[52] U.S. Cl. ............................ 55/269; 55/489; 55/491; 55/521; 55/526; 55/DIG. 25; 98/2.11
[58] Field of Search .............. 55/269, 385 B, 489, 55/491, 521, 525, 526, DIG. 17, DIG. 25; 62/93; 98/2.11

[56] References Cited

U.S. PATENT DOCUMENTS

| | | | |
|---|---|---|---|
| 1,734,125 | 11/1929 | Greene | 55/489 |
| 2,001,309 | 5/1935 | Kelly | 55/269 |
| 2,619,188 | 11/1952 | Haw et al. | 55/489 |
| 3,070,937 | 1/1963 | Bub | 55/521 |
| 3,304,696 | 2/1967 | McKenna | 62/93 |
| 4,158,449 | 6/1979 | Sun et al. | 55/489 |
| 4,163,373 | 8/1979 | van der Sluijs | 55/269 |

*Primary Examiner*—David L. Lacey
*Attorney, Agent, or Firm*—Paul M. Denk

[57] ABSTRACT

In a mist filter for use in eliminating moisture from the humidity laden air traversing through the evaporator of an automobile or other air conditioner, the filter comprises a pair of corrugated screens, with the corrugation of each screen being arranged perpendicularly with the corrugations of the other adjacent screen, a pair of said screens being fastened together, and arranged contiguously with the evaporator of the air conditioner.

2 Claims, 5 Drawing Figures

MIST FILTER FOR EXTRACTING MOISTURE FROM OUTLET AIR FROM AUTO AIR CONDITIONER

BACKGROUND OF THE INVENTION

This invention relates generally to a filter, and more particularly to a corrugated multilayered screen type filter that effectively condenses moisture or mist from the chilled air emanating from the air conditioning system, such as one installed within an automobile.

Numerous styles of filters, even screen filters, have been available in the prior art, and usually these are designed for functioning as an oil or related fluid filter for eliminating impurities therefrom. For example, such is shown in the U.S. Pat. No. 3,085,381, to Sobeck, wherein a mesh screen filter functions as a separator of oil within a rotory compressor, with the filter lying longitudinally of its reservoir. The patent to Goodloe, U.S. Pat. No. 2,382,560, defines the corrugating of strips of metallic mesh before it is rolled and then passed through a tubular constricting jig for the purpose of forming a more denser filter for use in an oil bath type of filter that is employed for cleaning of air being admitted into the carburetion system of a motor.

The patent of Persson, U.S. Pat. No. 3,208,204, discloses an eliminator for use in separation of liquid from a gas, such being performed through the agency of a waved filter formed from a variety of shaped layers of expanded metal that are interweaved and then apparently used in a horizontally arranged endwise type of filter. Other United States patents showing separating devices include the patent to Griwatz, U.S. Pat. No. 3,880,626, comprising a device for separating a liquid from a gas stream, while the patent to Alliger, U.S. Pat. No. 3,659,402, discloses a screen network construction for an air pollution control apparatus. The patent to Minor, U.S. Pat. No. 3,878,594, discloses a method for manufacturing a filter media of expanded sheet material for use in a humidifier.

It is, therefore, the principal object of this invention to provide a mist eliminator in the form of a filter constructed of perpendicularly juxtaposed corrugated screens that effectively condense and remove a significant portion of the moisture of chilled air emanating from an automobile air conditioner.

Another object of this invention is to provide a particularly designed filter that may be constructed to any size needed for use in contiguity or proximity with the evaporator of various shaped auto air conditioners.

A further object of this invention is to provide a moisture remover that prevents the entrance of excessive humidity into the passenger portion of a vehicle where damp areas would otherwise be created.

Yet another object of this invention is to provide a mist filter constructed in a particular way that stimulates the clinging of moisture to its corrugated wires and then effectively causes their drainage through gravity into the drain pan of the auto air conditioner.

Another object of this invention is to provide a rather facile method for forming a corrugated multilayered filter for use in conjunction with an air conditioner.

These and other objects will become more apparent to those skilled in the art upon reviewing the summary of this invention, and upon undertaking a study of the description of its preferred embodiment in view of the drawing.

SUMMARY OF THE INVENTION

This invention contemplates the formation of a means for removal of mist, moisture, or some degree of the humidity contained within the chilled air emanating from the evaporator portion of an air conditioner installed within an automobile, and which, in practice, has been very effective in performing this function. For example, tests run upon the type of mist filter to be hereinafter summarized, have indicated its ability to consistently remove up to a pint an hour of the inherent moisture contained in the air flow from a compact vehicle, the most effective operation through the use of this filter being attained where the filter is more preferably maintained in contiguity with the downstream side of the said evaporator. Without the filter, none of this moisture is removed. Thus, a significant percentage of moisture is removed from the conditioned air.

The structure of this filter is devised from at least a pair of layers of screen mesh material, having approximately eighteen strands of wire per inch, although wire of finer or even courser grade may yet be effective when constructed in accordance with the teachings of this disclosure. In the preferred embodiment to be hereinafter described, a pair of the sceens are initially corrugated upon the corrugator and then arranged in overlying relationship with the corrugations of one layer of screen being arranged at an approximate perpendicular with respect to the corrugations of the second layer of screen. Then, the layers of screen are fastened together by means of some form of fastening means, such as a plurality of staples. Following this, the filter is then cut to that size required to provide coverage over the downstream side of the evaporator with which this filter is to be used. Finally, the filter, when fabricated in this manner may be then inserted into contiguity with the completed auto air conditioner, and more specifically, its evaporator, wherein it may function in either thermo-conductive contact or be arranged just in proximity therewith to effectively condense moisture upon its wires for flow downwardly into the normally under-disposed drain pan of the evaporator.

As to exactly why a screen filter of this type works so effectively to eliminate and condense moisture upon its surface is not totally known, other than the fact that the filter when arranged in contact with the evaporator apparently has a tendency to form globules of water through capillary attraction and which thereby eliminates some segment of the moisture from the chilled air. In the alternative, where the filter is maintained just slightly out of the contact with the evaporator, but yet immediately within the path of the chilled air discharging from the said evaporator, it is believed that the temperature differential between the evaporator surface, which will be quite cold, and the warmer surface of this screen filter has a tendency to cause moisture adherence to the screen surface.

DESCRIPTION OF THE PREFERRED EMBODIMENT

Figure 1:
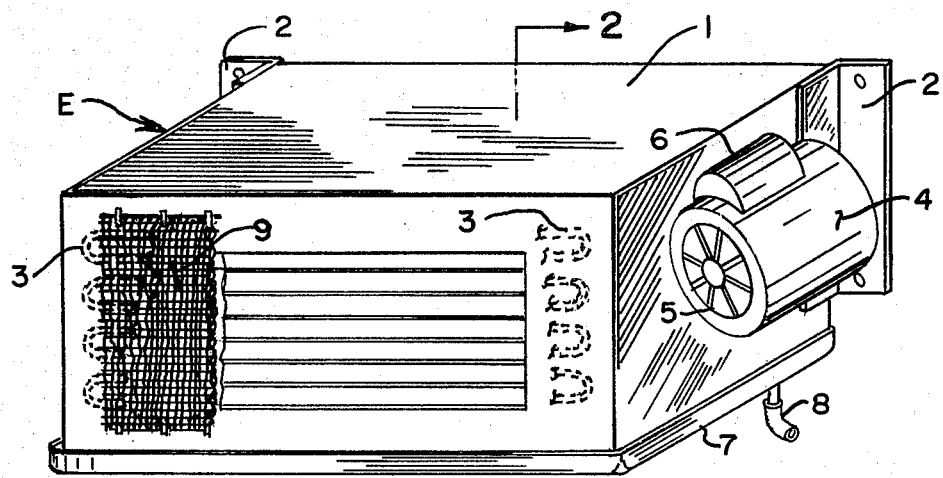
FIG. 1 shows an isometric view of the evaporator and fan motor portion of an auto air conditioner and showing the mist filter of this invention being installed just forwardly of said evaporator.

In referring to the drawing, and in particular FIG. 1, there is disclosed the evaporator section E of an auto air conditioner and which normally comprises a casing 1 held by brackets 2 to the firewall and under the dashboard of the vehicle in which the air conditioner is installed. Normally, in the over-the-counter trade, where such auto air conditioners are installed in vehicles after they are purchased, the evaporator portion will be located under the dashboard and within the passenger compartment of the vehicle. On the other hand, in original equipment, the auto air conditioner is usually installed on the firewall of the vehicle, under the hood, and being encased for protection against the heat and other deleterious conditions that may prevail through operations of the vehicle motor. In any event, regardless where the evaporator may be installed, its function is identical, and that is to take the pressurized Freon or other refrigerant and pass it through its integral coils 3 and therein effectively absorb heat from the passenger compartment of the vehicle to effect its cooling. A motor-pump 4 is normally associated with the evaporator, and draws air through its inlet 5 usually from the passenger compartment, and passes it through its outlet 6 wherein the air then traverses through the evaporator coils 3 and back into the passenger compartment. At the bottom of the housing 1 is a drain pan 7 which effectively collects any moisture condensing upon the evaporator, and the filter of this invention, wherein such collected moisture is then conveyed away by means of the drain hose 8 for discharge normally onto the ground. Shown disposed in front, or upon the downstream side of the passage of air through the evaporator, is the mist filter 9 of this invention.

Figure 2:
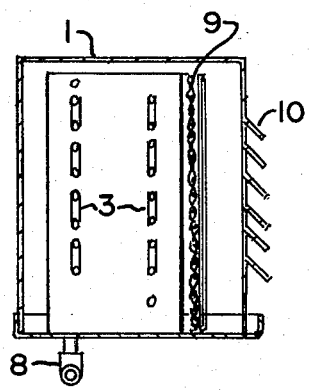
FIG. 2 provides a side view of the mist filter of this invention, and the evaporator portion of the air conditioner taken along the line 2—2 of FIG. 1.

Referring to FIG. 2, while the mist filter 9 is shown out of contact with the evaporator, and more particularly its coils 3, as previously described, the filter may also be arranged in contiguity with the downstream surface of the evaporator and therein further attract moisture from the passing air by means of a form of capillary action. Disposed forwardly of the filter of this invention is the grill work 10 of the evaporator housing.

The filter 9 is formed from at least a pair of pieces of screen material, and will be generally cut to dimensions that correspond with the overall dimensions of the evaporator coils. While the filter is shown as being of rectangular design, it is just as likely that such a filter may be constructed to any other dimensions, even to a round shape, or dimensions as small as four inches by twelve inches, or up to six inches by eighteen inches, which are the normal dimensions for evaporators of an auto air conditioner. In any event, and in referring also to FIGS. 3 and 4, the filter of this invention is comprised of a pair of layers of screen material 11 and 12, having a mesh of approximately eighteen per inch, at least in the preferred embodiment, and which are then corrugated in the manner as shown in the drawings. In the assembly of the filter, where the two layers of screen are brought together, the corrugations of one will be arranged nearly perpendicularly with respect to the corrugation of the other, and this has been found to enhance the moisture condensing attributes of the filter in usage. As can be seen, the filter layer 11 has its corrugations arranged substantially horizontally, while the corrugations of the filter layer 12 are shown being vertically aligned. Hence, when these two layers of filter are brought together, the corrugations are arranged in perpendicularity to attain enhanced results desired from a filter of this invention.

Figure 5:
FIG. 5 provides a partial view of one of the corrugated filters taken along the sectional view 5—5 of FIG. 4.

As can be seen in FIG. 5, when one layer of screen filter is corrugated, its various integral strands of wire that make up the screen are likewise bent into curvature and into a serpentine shape in order to preserve the corrugated structure of the screen and to which it has been molded through the use of a standard corrugator. Since screen wire is being employed for this purpose, the wire does have a tendency to retain its corrugated shape after it has been pressed upon traversing through a corrugating machine.

Figure 3:
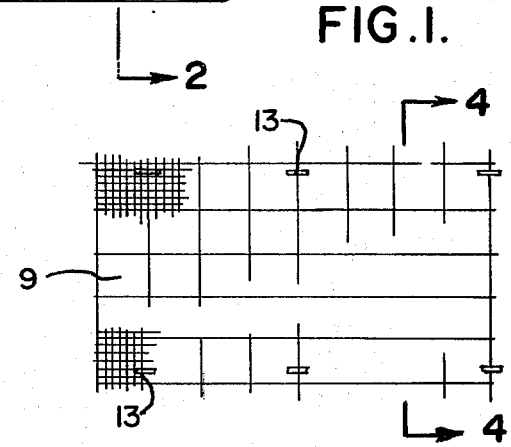
FIG. 3 provides a front view of the mist filter of this invention.
Figure 4:
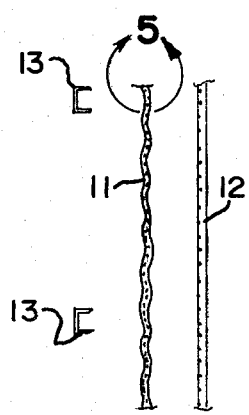
FIG. 4 provides a slightly exploded view of the mist filter of this invention when formed of two layers of corrugated screen, just prior to their fastening by means of the shown staples.

As can be further seen from FIGS. 3 and 4, in the processing of the filter of this invention, after the two or more layers of the corrugated screen are brought together, they are stapled in place, by means of the staples 13, in order to retain the layers together in preparation for their cutting into those shapes desired and required for the filter when being installed in conjunction with the particularly shaped evaporator coils of the automobile air conditioner.

Numerous variations to the structure of this filter may occur to those skilled in the art upon reviewing the subject matter of this invention. Such variations, if within the spirit of this invention, are intended to be protected by any claims to patent protection issuing hereon. The description of the preferred embodiment as previously set forth is meant to be merely illustrative of one embodiment of this invention.

Having thus described the invention what is claimed and desired to be secured by Letters Patent is:

1. A combination of an automobile air conditioner including an evaporator and a filter for removing water from the moisture laden air passing through said evaporator, said filter maintained in thermal conductive contact with said evaporator upon its air downstream side thereof, said filter having a first layer of screen material, said screen material being corrugated, a second layer of screen material, said second layer of screen material also being corrugated and with the corrugations of the second layer of screen material being arranged contiguous with and perpendicular with respect to the corrugations of the first layer of screen material, fastener means holding said first and second layers of screen material in contiguity, said filter incorporating the juxtaposed corrugated layes of screen material and through the temperature differential between the chilled surface of the said evaporator and the warmer surface of the screen filter causing moisture to adhere particularly through capillary attraction on the said filter thereby effectively eliminating a substantial percent of the moisture from the moisture laden air passing through said evaporator and said filter.

2. The combination of claim 1 and wherein said fastener means comprises staples.

* * * * *

UNITED STATES PATENT AND TRADEMARK OFFICE
CERTIFICATE OF CORRECTION

PATENT NO. : 4,256,472
DATED : March 17, 1981
INVENTOR(S) : Jack Atkins and William E. Cayce It is certified that error appears in the above-identified patent and that said Letters Patent are hereby corrected as shown below:

Column 4, line 57 change "layes" to ---layers---.

Signed and Sealed this

Second Day of June 1981

[SEAL]

Attest:

RENE D. TEGTMEYER

Attesting Officer

Acting Commissioner of Patents and Trademarks